(12) United States Patent
Ichihara et al.

(10) Patent No.: US 11,866,796 B2
(45) Date of Patent: Jan. 9, 2024

(54) GRAIN-ORIENTED ELECTRICAL STEEL SHEET AND PRODUCTION METHOD THEREFOR

(71) Applicant: JFE STEEL CORPORATION, Tokyo (JP)

(72) Inventors: Yoshihisa Ichihara, Tokyo (JP); Takeshi Omura, Tokyo (JP); Kunihiro Senda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 47 days.

(21) Appl. No.: 17/596,584

(22) PCT Filed: Apr. 17, 2020

(86) PCT No.: PCT/JP2020/016843
§ 371 (c)(1),
(2) Date: Dec. 14, 2021

(87) PCT Pub. No.: WO2020/255552
PCT Pub. Date: Dec. 24, 2020

(65) Prior Publication Data
US 2022/0298599 A1    Sep. 22, 2022

(30) Foreign Application Priority Data

Jun. 17, 2019    (JP) .................................. 2019-112292

(51) Int. Cl.
*C21D 10/00* (2006.01)
*H01F 1/16* (2006.01)

(52) U.S. Cl.
CPC ............. *C21D 10/005* (2013.01); *H01F 1/16* (2013.01); *C21D 2201/05* (2013.01)

(58) Field of Classification Search
CPC ..... C22C 38/00; C22C 38/02; C22C 2202/02; C21D 6/008; C21D 9/46; C21D 9/48;
(Continued)

(56) References Cited

U.S. PATENT DOCUMENTS

| 4,437,908 A | 3/1984 | Inoue |
|---|---|---|
| 9,536,658 B2 | 1/2017 | Omura et al. |

(Continued)

FOREIGN PATENT DOCUMENTS

| CN | 103069035 A | 4/2013 |
|---|---|---|
| CN | 104024451 A | 9/2014 |

(Continued)

OTHER PUBLICATIONS

May 31, 2022, the Extended European Search Report issued by the European Patent Office in the corresponding European Patent Application No. 20827480.3.

(Continued)

*Primary Examiner* — Vanessa T. Luk
(74) *Attorney, Agent, or Firm* — KENJA IP LAW PC

(57) ABSTRACT

Provided is a grain-oriented electrical steel sheet that combines low iron loss and low magnetostriction, together with an advantageous production method therefor. A grain-oriented electrical steel sheet comprises a linear strain portion extending in a direction intersecting a rolling direction of the grain-oriented electrical steel sheet, wherein the linear strain portion has a stress distribution in which a compressive stress region and a tensile stress region alternate in a longitudinal direction of the linear strain portion. The linear strain portion is formed by vibrating the grain-oriented electrical steel sheet in a sheet thickness direction, while irradiating a surface of the grain-oriented electrical steel sheet with an electron beam by repeatedly moving and (Continued)

detaining the electron beam in the direction intersecting the rolling direction of the grain-oriented electrical steel sheet.

4 Claims, 6 Drawing Sheets

(58) Field of Classification Search
CPC .. C21D 10/00; C21D 10/005; C21D 2201/05; C21D 2221/00; H01F 1/147; H01F 1/14766; H01F 1/14775; H01F 1/14783; H01F 1/14791; H01F 1/16; H01F 1/18; H01F 27/245; H01F 27/2455; H01F 41/0233
See application file for complete search history.

(56) References Cited

U.S. PATENT DOCUMENTS

| | | | |
|---|---|---|---|
| 9,761,361 | B2 | 9/2017 | Okabe et al. |
| 2013/0143050 | A1 | 6/2013 | Omura et al. |
| 2015/0010762 | A1 | 1/2015 | Yamaguchi et al. |
| 2015/0013849 | A1 | 1/2015 | Okabe et al. |
| 2015/0187474 | A1* | 7/2015 | Takajo ............... C21D 9/46 148/112 |
| 2017/0016085 | A1 | 1/2017 | Toda et al. |
| 2018/0037965 | A1 | 2/2018 | Takajo et al. |
| 2019/0112697 | A1 | 4/2019 | Hiratani et al. |

FOREIGN PATENT DOCUMENTS

| | | |
|---|---|---|
| CN | 104105808 A | 10/2014 |
| CN | 106029917 A | 10/2016 |
| CN | 107250391 A | 10/2017 |
| EP | 2799576 A1 | 11/2014 |
| JP | S51116138 A | 10/1976 |
| JP | S5656605 A | 5/1981 |
| JP | S61269973 A | 11/1986 |
| JP | H0622179 B2 | 3/1994 |
| JP | H07192891 A | 7/1995 |
| JP | 2012036443 A | 2/2012 |
| JP | 2012036445 A | 2/2012 |
| JP | 2013159833 A * | 8/2013 |
| JP | 2013159833 A | 8/2013 |
| JP | 2015206114 A | 11/2015 |
| JP | 2017128765 A | 7/2017 |
| KR | 1020140133838 A | 11/2014 |
| WO | 2012164702 A1 | 12/2012 |
| WO | 2013118512 A1 | 8/2013 |
| WO | 2017170749 A1 | 10/2017 |

OTHER PUBLICATIONS

Oct. 18, 2022, Office Action issued by the Canadian Intellectual Property Office in the corresponding Canadian Patent Application No. 3,143,693.

Jul. 14, 2020, International Search Report issued in the International Patent Application No. PCT/JP2020/016843.

Jul. 27, 2021, Notification of Reasons for Refusal issued by the Japan Patent Office in the corresponding Japanese Patent Application No. 2020-540820 with English language Concise Statement of Relevance.

Dec. 8, 2022, Office Action issued by the China National Intellectual Property Administration in the corresponding Chinese Patent Application No. 202080043913.5 with English language search report.

Aug. 21, 2023, Office Action issued by the Korean Intellectual Property Office in the corresponding Korean Patent Application No. 10-2021-7041294 with English language concise statement of relevance.

* cited by examiner

GRAIN-ORIENTED ELECTRICAL STEEL SHEET AND PRODUCTION METHOD THEREFOR

TECHNICAL FIELD

The present disclosure relates to a grain-oriented electrical steel sheet suitable as an iron core material of a transformer and the like, and a production method therefor.

BACKGROUND

In view of energy saving and environmental regulations, reduction of energy loss in transformers and reduction of noise during operation of transformers are required in recent years. Given that energy loss and noise of a transformer correlate with iron loss and magnetostriction of a grain-oriented electrical steel sheet used as its iron core material, there is a need to develop electrical steel sheets having favorable iron loss property and magnetostrictive property.

Iron loss of a grain-oriented electrical steel sheet can be divided between hysteresis loss and eddy current loss. It is known that hysteresis loss is effectively reduced by improving the degree of preferred crystal orientation of a steel substrate or reducing impurities.

Known methods of improving eddy current loss include not only increasing electric resistance by adding Si but also a magnetic domain refining technique. The magnetic domain refining technique is a method whereby grooves or strain is introduced into a steel sheet to improve the iron loss of the steel sheet drastically.

For example, JP H6-22179 B2 (PTL 1) discloses a technique of introducing linear grooves of 300 µm or less in width and 100 µm or less in depth on a steel sheet surface to reduce iron loss from 0.80 W/kg or more to 0.70 W/kg or less.

JP H7-192891 A (PTL 2) discloses a method of applying plasma flames in a sheet transverse direction on a steel sheet surface after secondary recrystallization to locally introduce thermal strain, thus reducing, for a steel sheet whose magnetic flux density ($B_8$) when excited with a magnetizing force of 800 A/m is 1.935 T, iron loss ($W_{17/50}$) when excited with a maximum magnetic flux density of 1.7 T and a frequency of 50 Hz to 0.680 W/kg.

It is known that magnetic domain refining by strain introduction can reduce iron loss but causes an increase in magnetostriction due to strain introduction. A number of attempts have been made to produce a grain-oriented electrical steel sheet of low iron loss and low magnetostriction by controlling strain introduction.

For example, JP 2017-128765 A (PTL 3) discloses a method of vibrating a focus lens in a process of irradiating a steel sheet with a laser to introduce strain. With this method, however, a closure domain is not linearly formed, so that transformer core loss increases as compared with the case of irradiating the steel sheet with the laser without vibrating the lens.

JP 2012-36445 A (PTL 4) discloses a method of producing a material of low iron loss and low magnetostriction by, in a process of irradiating a grain-oriented electrical steel sheet with an electron beam to introduce strain, increasing the tension of a forsterite film of the steel sheet and applying the beam in a dot shape to form a non-uniform compressive stress region in a rolling direction. With this method, it is essential to increase the forsterite film tension. In the case where the forsterite film tension is increased, however, shear stress at the interface with the steel substrate increases. This is likely to cause problems during production as the film tends to exfoliate when applying the beam.

CITATION LIST

Patent Literature

PTL 1: JP H6-22179 B2
PTL 2: JP H7-192891 A
PTL 3: JP 2017-128765 A
PTL 4: JP 2012-36445 A

SUMMARY

Technical Problem

It could therefore be helpful to provide a grain-oriented electrical steel sheet that combines low iron loss and low magnetostriction and has excellent transformer properties, together with an advantageous production method therefor.

Solution to Problem

As a method of combining low iron loss and low magnetostriction in a grain-oriented electrical steel sheet, we studied how to form a closure domain with a smaller strain amount, and took notice of a closure domain formation mechanism.

When a grain-oriented electrical steel sheet is irradiated with an electron beam, a part irradiated with the electron beam ("beam irradiation region" in FIG. 1, hereafter also referred to as "irradiated portion") is rapidly heated locally, and thermal strain is formed as a result of thermal expansion and thermal contraction. Here, compressive stress remains in the irradiated portion both in a rolling direction of the steel sheet and in a sheet transverse direction intersecting the rolling direction (FIG. 1). Typically, dispersion of heat is isotropic, and Young's modulus is isotropic for an ordinary material, so that compressive stress is isotropic. In a grain-oriented electrical steel sheet, on the other hand, crystal grains having GOSS orientation (110)[001] which is an easy magnetization axis accumulate in the rolling direction, and accordingly Young's modulus is anisotropic. Hence, greater compressive stress remains in the rolling direction than in the sheet transverse direction. This causes the formation of a magnetic domain (closure domain) having a magnetization direction in the sheet transverse direction, and magnetic domains are refined and the iron loss decreases.

Thus, in the grain-oriented electrical steel sheet, as a result of compressive stress occurring in the rolling direction, a closure domain having magnetization in a direction perpendicular to the easy magnetization axis forms. This effect is called "magnetoelastic effect". The magnetoelastic effect is a phenomenon in which, in the case where stress is applied to a material having a positive magnetostriction constant such as silicon steel, magnetization tends to occur in a direction parallel to a stress axis direction if the stress is tensile stress and occur in a direction orthogonal to the stress axis direction if the stress is compressive stress. This indicates that not only compressive stress in the rolling direction as in conventional techniques but also tensile stress in the sheet transverse direction is effective in forming a closure domain having a magnetization direction in the sheet transverse direction in the grain-oriented electrical steel sheet. We thus discovered that, by inducing not only compressive stress in the rolling direction as in conventional techniques but also tensile stress in the sheet transverse direction in the irradiated portion, the magnetoelastic effect is further enhanced and the closure domain is formed more effectively.

Based on such findings, we intensively studied how to induce tensile stress in the sheet transverse direction of the grain-oriented electrical steel sheet by electron beam irradiation. We consequently discovered that, by irradiating the steel sheet with an electron beam in the sheet transverse direction and in a dot shape while vibrating the steel sheet in the sheet thickness direction, linear strain (linear strain portion) can be introduced with periodical variation in intensity in the sheet transverse direction in the irradiated portion, as a result of which a stress distribution in which a compressive stress region and a tensile stress region alternate in the longitudinal direction of the introduced linear strain (sheet transverse direction) as illustrated in FIG. 2 can be formed. Besides vibrating the steel sheet, another method of introducing strain into the steel sheet with periodical variation in intensity in the sheet thickness direction of the steel sheet is to change the position of an electron beam focusing coil or the amount of current passing through the focusing coil. However, such method may cause, for example, degradation in beam convergence due to variation of the magnetic field of the coil. We accordingly reached the conclusion that the steel sheet itself is to be vibrated.

By performing magnetic domain refining treatment based on the above-described technique, a closure domain can be formed easily, and the amount of strain necessary to achieve the same iron loss improving effect as in conventional techniques can be reduced. A grain-oriented electrical steel sheet of low iron loss and low magnetostriction can thus be provided. Such a grain-oriented electrical steel sheet can be used to provide a transformer of low energy loss and low noise. The magnetoelastic effect is higher for a material having high crystalline orientation, i.e. having high magnetic flux density $B_8$. In view of this, the above-described technique contributes to lower iron loss and lower magnetostriction for an electrical steel sheet having high magnetic flux density, and contributes to lower noise for a transformer produced using the electrical steel sheet.

We thus provide:

(1) A grain-oriented electrical steel sheet comprising a linear strain portion extending in a direction intersecting a rolling direction of the grain-oriented electrical steel sheet, wherein the linear strain portion has a stress distribution in which a compressive stress region and a tensile stress region alternate in a longitudinal direction of the linear strain portion.

(2) The grain-oriented electrical steel sheet according to (1), wherein a maximum compressive stress in the compressive stress region is 30 MPa or more and not more than a yield stress, and a maximum tensile stress in the tensile stress region is 20 MPa or more and not more than the yield stress.

(3) The grain-oriented electrical steel sheet according to (1) or (2), comprising a magnetic flux density $B_8$ of 1.94 T or more.

(4) A production method for a grain-oriented electrical steel sheet, comprising forming a linear strain portion in a grain-oriented electrical steel sheet, wherein the linear strain portion is formed by vibrating the grain-oriented electrical steel sheet in a sheet thickness direction, while irradiating a surface of the grain-oriented electrical steel sheet with an electron beam by repeatedly moving and detaining the electron beam in a direction intersecting a rolling direction of the grain-oriented electrical steel sheet.

(5) The production method for a grain-oriented electrical steel sheet according to (4), wherein an amplitude of the vibration of the grain-oriented electrical steel sheet in the sheet thickness direction is 1 mm or less.

Advantageous Effect

It is thus possible to produce a grain-oriented electrical steel sheet that can reduce energy loss and noise of transformers.

DETAILED DESCRIPTION

Experimental results that led to the presently disclosed technique will be described below.

Figure 1:
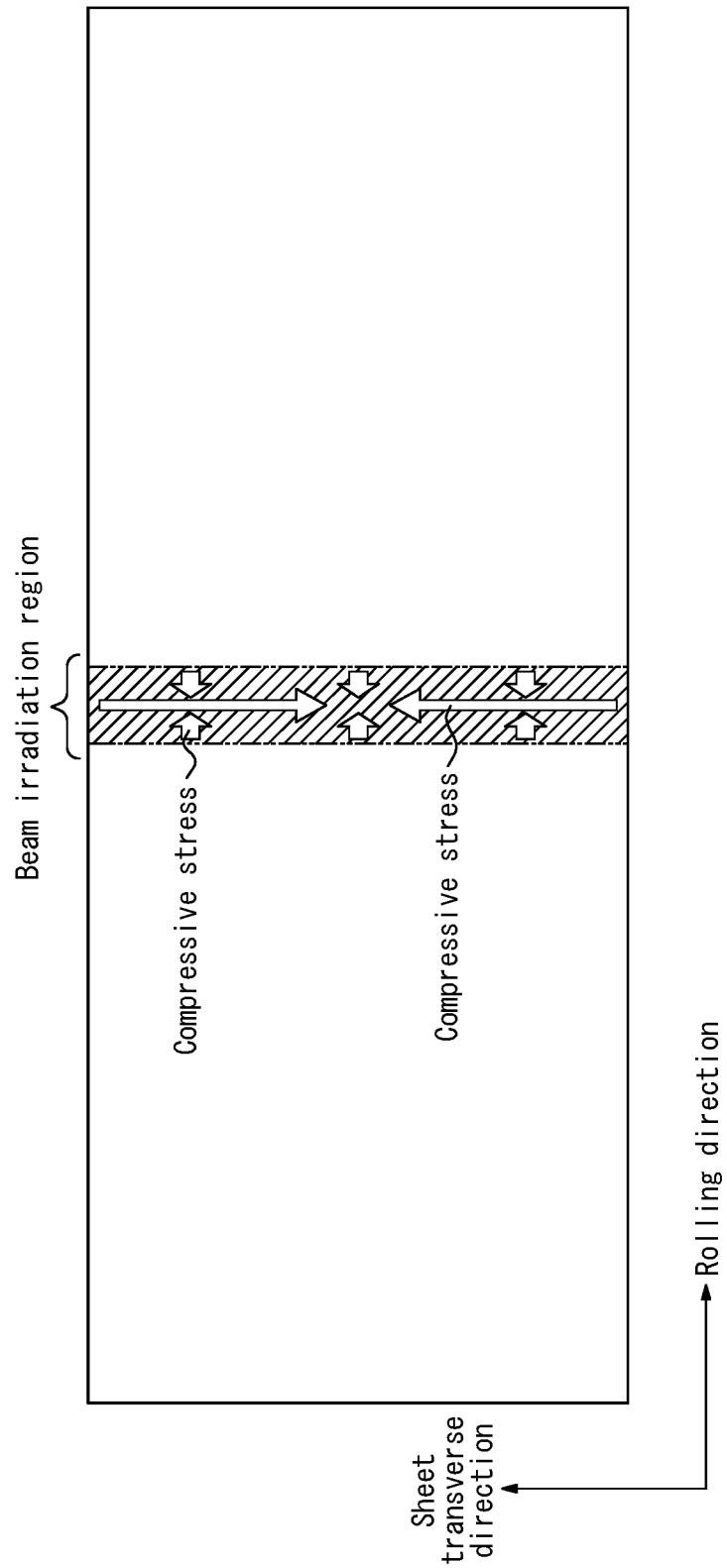
FIG. 1 is a plan view of a grain-oriented electrical steel sheet having compressive stress as a result of being irradiated with an electron beam.
Figure 2:
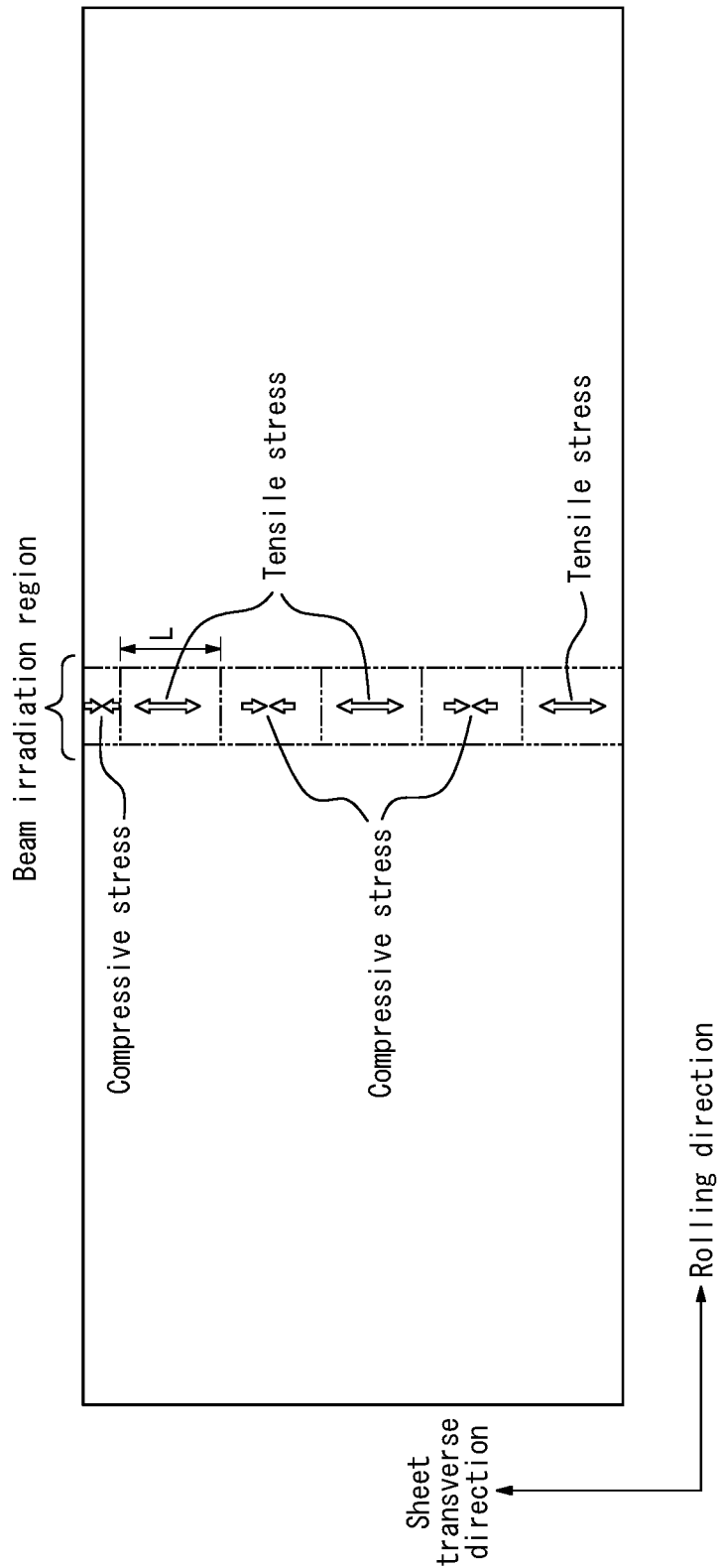
FIG. 2 is a plan view of a grain-oriented electrical steel sheet in which compressive stress and tensile stress alternate in a sheet transverse direction in a beam irradiation region.

It is commonly known that, by irradiating a steel sheet with an electron beam under the condition that the electron beam is focused on the steel sheet surface, the energy density is maximized and high strain introduction effect is achieved. Hence, a typical magnetic domain refining process for grain-oriented electrical steel sheets involves control to apply an electron beam in a state of being focused on the steel sheet surface. As a method of obtaining a stress distribution in which a compressive stress region and a tensile stress region alternate in the longitudinal direction of introduced linear strain (beam irradiation region) as illustrated in FIG. 2, we examined so-called dot-shaped irradiation (see FIG. 3), i.e. applying an electron beam while repeatedly moving and detaining (stopping to stay) the electron beam. However, simple dot irradiation did not yield the foregoing stress distribution. This is because, even when the electron beam is applied in a dot shape, the electron beam is kept focused on the steel sheet surface not only in the beam detaining point but also in the beam moving region, which results in no substantially large difference in strain amount between the moving region and the detaining point.

We intensively studied how to increase the difference in strain amount in the irradiated portion by the dot-shaped irradiation, and learned the following: When the focus position is varied in the sheet thickness direction with a constant period during beam irradiation, thermal strain by beam irradiation is hardly introduced and substantially no stress field is formed in the beam moving region. Meanwhile, in the beam detaining point, the irradiation with the beam continues for a certain time, so that there is substantially no change in strain amount by the focus variation and constant compressive stress remains due to thermal strain. This creates a distribution of thermal strain that differs greatly between the moving region and the detaining point of the electron beam. The moving region is in a state of being pulled in the direction of a line segment connecting adjacent beam detaining points due to the influence of compressive stress of the adjacent beam detaining points, which results in the formation of tensile stress. Consequently, a stress distribution in which a compressive stress region and a tensile stress region alternate as illustrated in FIG. 2 is formed.

Usually, the steel sheet during sheet passing is controlled not to vibrate, in order to perform beam irradiation under the condition that the electron beam is focused on the steel sheet surface. Based on the foregoing knowledge, however, we found out that, by intentionally vibrating the steel sheet in the sheet thickness direction during sheet passing, it is possible to achieve both magnetic domain refining while periodically varying the focus position in the thickness direction of the steel sheet and production by passing the steel sheet.

Next, to determine the appropriate vibration range of the steel sheet, we investigated how the amplitude of the steel sheet influences the iron loss improvement amount, the noise change amount, and the stress distribution (changes in compressive stress value and tensile stress value) in the sheet transverse direction of the grain-oriented electrical steel sheet when the steel sheet is irradiated with an electron beam of 450 W in power in a dot shape with a detaining time of 8 µs, a moving rate of 40 m/s, and a moving region length of 120 µm while changing the vibration amount of the steel sheet during sheet passing.

Figure 4:
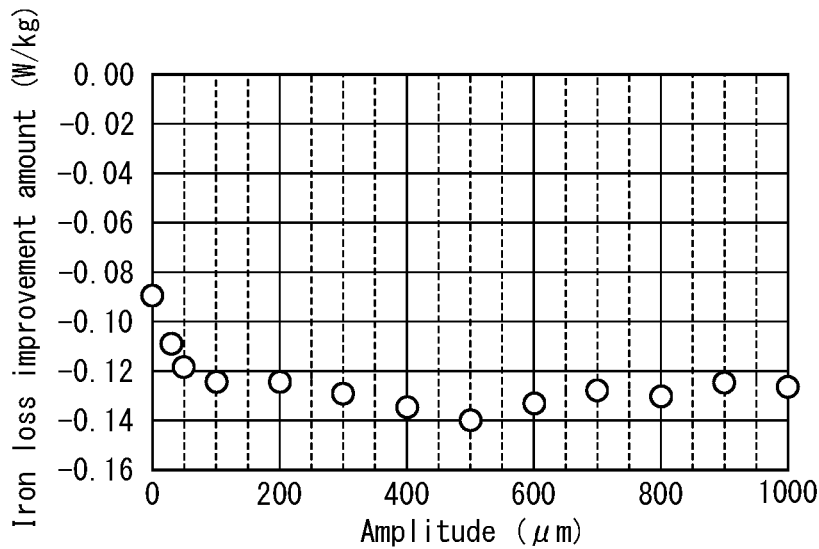
FIG. 4 is a graph illustrating the relationship between the amplitude and the iron loss improvement amount of a steel sheet.
Figure 5:
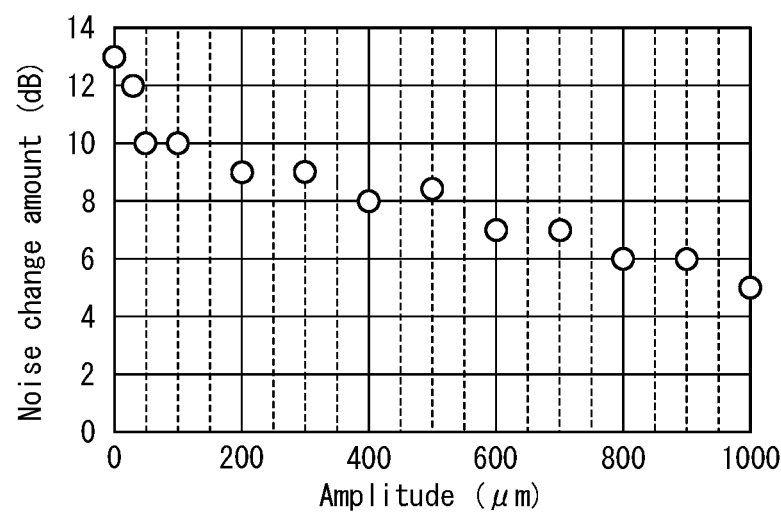
FIG. 5 is a graph illustrating the relationship between the amplitude and the noise change amount of a steel sheet.
Figure 6:
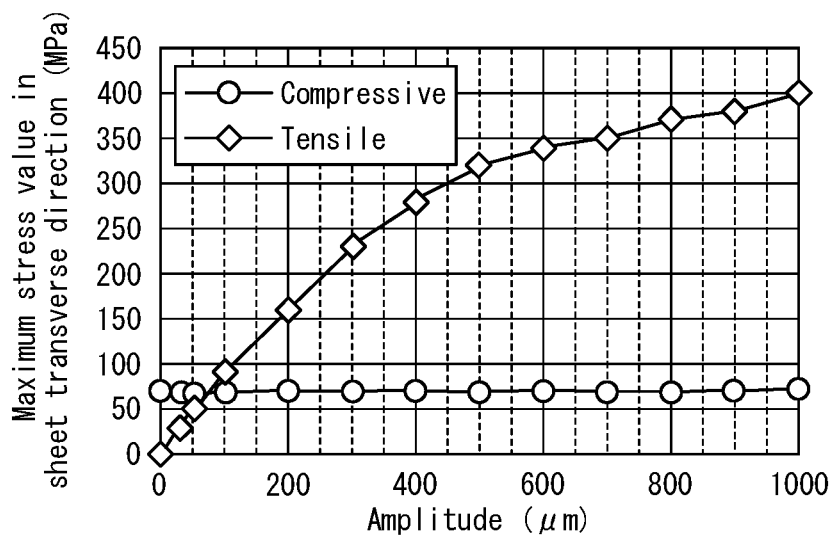
FIG. 6 is a graph illustrating the relationship between the amplitude and the maximum stress value in the sheet transverse direction of a steel sheet.

FIGS. 4 to 6 respectively illustrate the results of investigating the iron loss improvement amount, the noise change amount, and the compressive stress value and the tensile stress value when changing the amplitude of the steel sheet in the sheet thickness direction. The amplitude, as vertical vibration of the horizontally placed steel sheet, was applied by installing a guide roll on the rear surface which is opposite to the surface where the electron beam is irradiated, and varying the roll position. When the amplitude of the steel sheet exceeded 1 mm, a fracture occurred in the part of contact between the steel sheet and the sheet passing roll, and magnetic domain refining treatment was hindered. In the case of performing the dot-shaped irradiation without vibrating the steel sheet, the electron beam was focused on the steel sheet surface even in the beam moving region, so that thermal strain was introduced even in the moving region to thus form a compressive stress region. Consequently, the desired stress distribution according to the present disclosure, i.e. the stress distribution in which a tensile stress region and a compressive stress region alternate, was not obtained, and the effect of iron loss reduction and noise reduction (magnetostriction reduction) was not achieved.

As illustrated in FIG. 4, as a result of vibrating the steel sheet, an iron loss improvement of 0.01 W/kg or more was seen as compared with the case of not vibrating the steel sheet. The reason for this is presumed as follows: As a result of vibrating the steel sheet, the focus position changed continuously, and the strain amount in the moving region became lower than usual. Meanwhile, in the detaining point, the irradiation with the beam continued for a certain time, so that the strain amount did not change significantly. This created a large difference in strain amount between the moving region and the detaining point, and consequently induced tensile stress in the sheet transverse direction which is the electron beam scanning direction. This tensile stress functioned to stabilize a closure domain to a higher magnetic field, and thus the iron loss improving effect was enhanced.

As illustrated in FIG. 5, noise (magnetostriction) tended to decrease with an increase in amplitude. This is presumed to be because, as the amplitude increased, the deviation of focus increased, and the total amount of strain introduced in the moving region with the same beam power decreased.

FIG. 6 illustrates the maximum value of residual stress in the sheet transverse direction measured by the below-described technique, in a linear strain portion of each sample. The maximum value of compressive stress changed little with the amplitude. Meanwhile, tensile stress occurred for the first time when vibrating the steel sheet, and its maximum value tended to increase with an increase in amplitude. This is presumed to be because, as a result of vibrating the steel sheet, a part in which the electron beam was focused and a part in which the electron beam was not focused occurred periodically, and consequently the time during which the electron beam was focused in the beam moving region decreased and thermal strain was hardly introduced in the moving region. In the detaining point, on the other hand, the irradiation of the beam continued for a certain time, so that the decrease of the strain amount due to vibration had little influence. This created a large difference in the amount of introduced strain between the moving region and the detaining point. Hence, the moving region in which thermal strain was hardly introduced was pulled by the compressive stress region formed by thermal strain in its adjacent detaining point, and thus a stress distribution having alternating compressive stress regions and tensile stress regions was formed.

The reason why the tensile stress increased with an increase in amplitude is presumed to be because, as a result of the amplitude increasing, the deviation of focus increased and the difference in strain amount increased.

Based on these results, in this embodiment, when performing magnetic domain refining treatment by irradiating a steel sheet with an electron beam in a dot shape, the steel sheet is vibrated in the sheet thickness direction with such an amplitude (1 mm or less) that is controlled not to cause a fracture, in order to obtain a grain-oriented electrical steel sheet excellent in both iron loss and magnetostriction properties.

Figure 7:
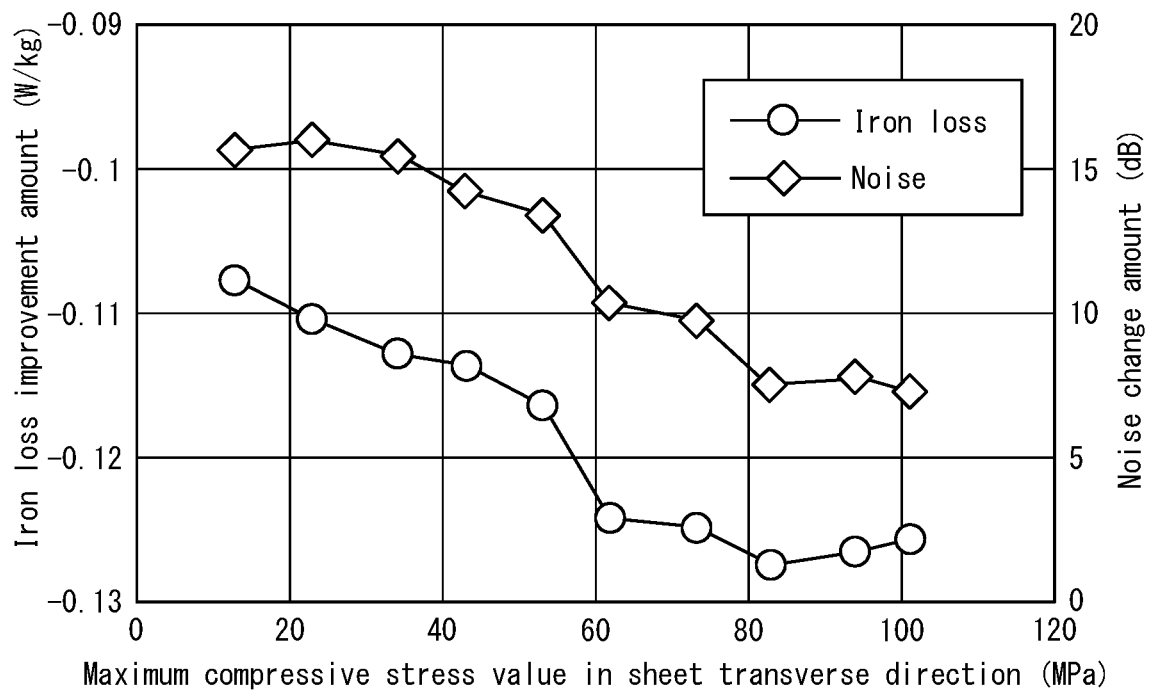
FIG. 7 is a graph illustrating the relationship between the compressive stress maximum value in the sheet transverse direction and each of the iron loss improvement amount and the noise change amount.
Figure 8:
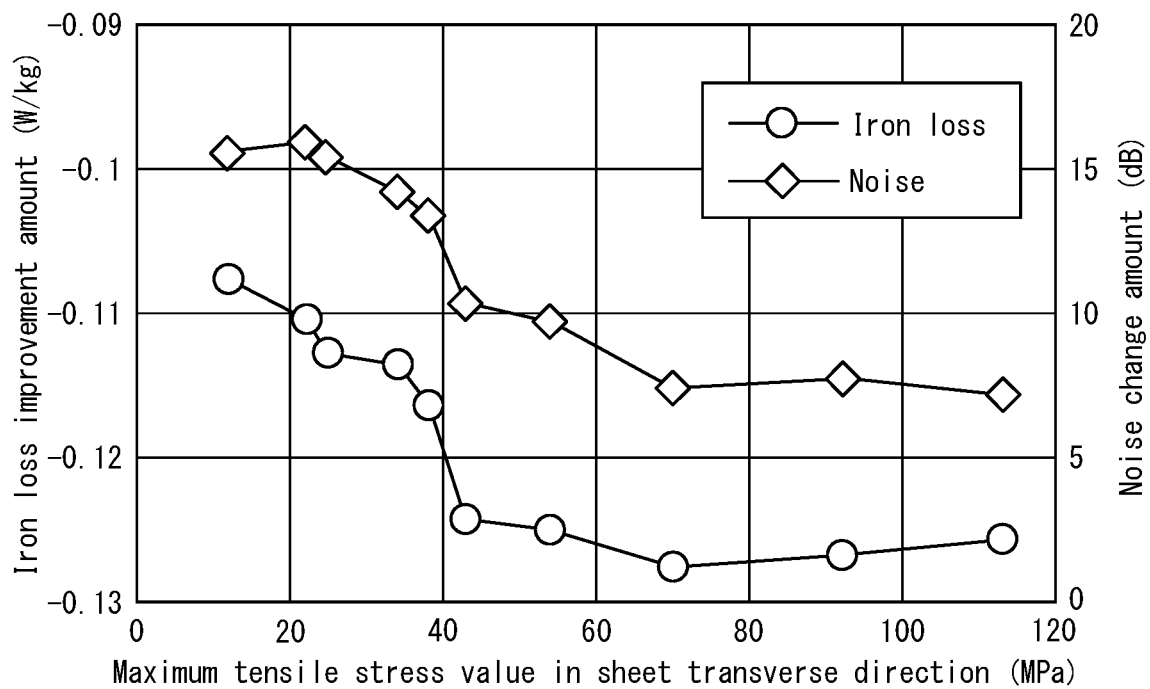
FIG. 8 is a graph illustrating the relationship between the tensile stress maximum value in the sheet transverse direction and each of the iron loss improvement amount and the noise change amount.

Next, samples different in maximum values of compressive stress and tensile stress were produced by changing the beam power in a state of fixing the amplitude of the steel sheet at 0.1 mm, and the relationship between each stress value and iron loss and noise (magnetostriction) was investigated. FIGS. 7 and 8 illustrate the results. In the case where the maximum value of tensile stress was 20 MPa or more and in the case where the maximum value of compressive stress was 30 MPa or more, reduction in iron loss was clearly recognized. In the case where the maximum value of tensile stress was 40 MPa or more and the maximum value of compressive stress was 60 MPa or more, the effect of iron loss reduction and noise reduction (magnetostriction reduction) was particularly high. The effect by an increase in tensile stress is as mentioned above. Regarding the effect of improvement by an increase in compressive stress in the sheet transverse direction, which is supposed to be disadvantageous in closure domain formation, we presume the reason as follows: The magnitude of compressive stress in the sheet transverse direction correlates with the intensity of strain that occurs at a point on which the beam is focused. When the compressive stress in the sheet transverse direction increased, the difference in strain amount from a point on which the beam is not focused due to vibration increased, so that the tensile stress in the sheet transverse direction increased. This led to improvement of the effect according to the present disclosure.

Based on the foregoing results, we examined whether the same effects would be achieved by magnetic domain refining treatment using laser irradiation instead of electron beam irradiation. However, the same effects were not observed with laser irradiation. This is presumed to be because of the difference in heat input process between an electron beam and a laser. An electron beam has high transmissivity for substances. Accordingly, strain was able to be introduced into the steel sheet even when the beam was not focused on the steel sheet surface. On the other hand, a laser has low transmissivity, and mainly involves heat transfer from the surface. Accordingly, strain was hardly introduced in the case where the beam was not focused on the steel sheet surface.

We also examined whether the same effects would be achieved by vibrating the steel sheet while irradiating the steel sheet with the electron beam linearly and continuously instead of in a dot shape. The same effects were not observed in this case, either. This is presumed to be because, in the case of irradiating the steel sheet with the electron beam linearly continuously, the strain amount decreased throughout the linear strain portion like in the moving region in the case of dot-shaped irradiation.

One of the disclosed embodiments will be described in detail below.

Grain-Oriented Electrical Steel Sheet

In this embodiment, a grain-oriented electrical steel sheet produced by a known method is irradiated with an electron beam in a direction intersecting a rolling direction to introduce one or more linear strain portions.

Linear Strain Portion

Figure 3:
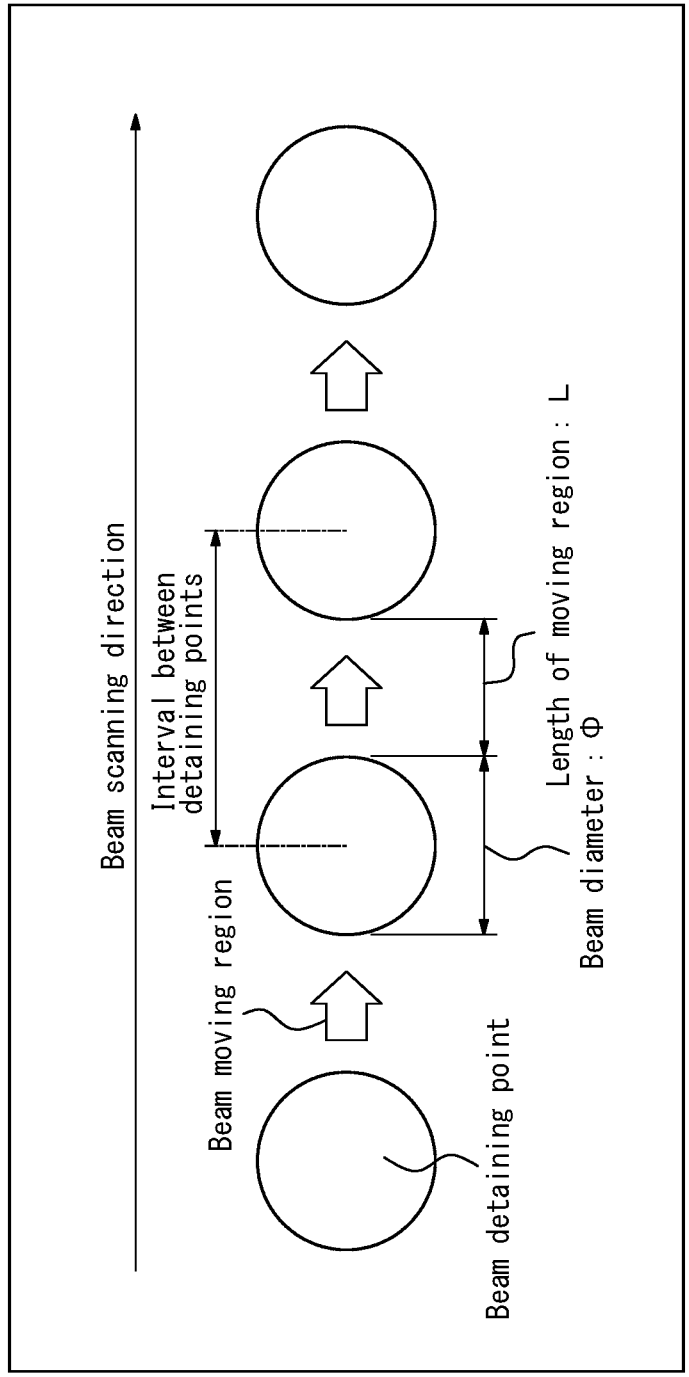
FIG. 3 is a schematic view of dot-shaped irradiation of a grain-oriented electrical steel sheet with an electron beam.

In this embodiment, one or more linear strain portions (regions on the steel sheet surface where the strain is linearly introduced) are introduced by irradiating the steel sheet with the electron beam in the direction intersecting the rolling direction of the steel sheet, as mentioned above. Of such linear strain portions, strain introduced by detaining the electron beam causes compressive stress regions to form, with tensile stress regions forming between the compressive stress regions. With reference to FIG. 3, the length of each tensile stress region in the sheet transverse direction (moving region length L) is desirably 0.5Φ or more, and desirably 5.5Φ or less, where Φ is the beam diameter. If the moving region length L is less than 0.5Φ, adjacent detaining points are excessively close to each other. This hinders sufficient closure domain formation, and causes a decrease in iron loss improvement. If the moving region length L is more than 5.5Φ, a closure domains is formed not in a continuous linear shape but in a local island shape, as a result of which the magnetic domain refining effect decreases.

Maximum Compressive Stress in Compressive Stress Region: 30 MPa or More and not More than Yield Stress Maximum Tensile Stress in Tensile Stress Region: 20 MPa or More and not More than Yield Stress According to the present disclosure, each linear strain portion has at least a stress distribution in which a compressive stress region and a tensile stress region alternate in the longitudinal direction of the linear strain. Here, the maximum compressive stress in the compressive stress region is preferably 30 MPa or more, and the maximum tensile stress in the tensile stress region is preferably 20 MPa or more. If the maximum compressive stress is 30 MPa or more, the closure domain is reliably formed, and the magnetic domain refining effect is enhanced. If the maximum tensile stress is 20 MPa or more, the closure domain is sufficiently stabilized by the magnetoelastic effect, and the iron loss reduction effect is enhanced. The maximum compressive stress is more preferably 60 MPa or more, and further preferably 80 MPa or more. The maximum tensile stress is more preferably 40 MPa or more, and further preferably 60 MPa or more. The maximum compressive stress and the maximum tensile stress herein respectively denote the maximum stress values in the compressive stress region and the tensile stress region obtained by the below-described stress measurement method.

The maximum compressive stress and the maximum tensile stress are each preferably not more than yield stress, in order to prevent a fracture during the production of the grain-oriented electrical steel sheet. The yield stress herein denotes a value obtained by measuring, by a tensile test, a sample collected from a steel strip after cold rolling and before electron beam irradiation.

Stress Measurement Method

As the stress measurement method for the steel sheet, the amount of strain introduced into the steel sheet is measured by EBSD-Wilkinson method or XRD measurement using high energy X-rays, and the stress is calculated from the strain amount, Young's modulus, and the like using analysis software such as CrossCourt Ver. 3.0 (produced by BLG Productions, Bristol).

In this embodiment, the strain measurement is performed with a measurement pitch of 5 µm in a range of 0.6 mm from the electron beam irradiation surface of the steel sheet in each of the rolling direction and the sheet transverse direction. Here, an observation field was set such that the strain distribution is symmetrical with respect to the center of the observation field, with a strain-free reference point necessary for strain measurement being set at an edge of the observation field.

Magnetic Flux Density $B_8$: 1.94 T or More

If the magnetic flux density $B_8$ is 1.94 T or more, the provision of the stress distribution according to the present disclosure has higher iron loss reduction effect. This is because the magnetoelastic effect is higher when $B_8$ is higher. Accordingly, the magnetic flux density $B_8$ of the grain-oriented electrical steel sheet before electron beam irradiation is preferably 1.94 T or more, and more preferably 1.95 T or more. Typically, the magnetic flux density does not change significantly by electron beam irradiation. Hence, the magnetic flux density of the grain-oriented electrical steel sheet after electron beam irradiation is preferably in the same range as above.

Electron Beam Irradiation Direction

In this embodiment, one or more electron guns are used to apply an electron beam in a direction intersecting the rolling direction of the steel sheet, to form at least one linear strain portion. The beam scanning direction is preferably in a range of 60° to 120° with respect to the rolling direction, and more preferably 90° with respect to the rolling direction, i.e. the sheet transverse direction (direction orthogonal to the rolling direction). If the deviation of the scanning line from the sheet transverse direction increases, the amount of strain introduced into the steel sheet increases, which leads to higher magnetostriction. The effect of improving iron loss and noise is achieved only by the irradiation method of repeatedly moving and detaining the electron beam in the scanning direction (dot-shaped irradiation, see FIG. 3).

Dot-Shaped Irradiation Conditions

An example of dot-shaped irradiation is an irradiation method of repeatedly moving and detaining an electron beam where the detaining time in each detaining point is 2 µs to 20 µs, the moving rate is 30 m/s or more, and the moving region length L is about 0.5Φ to 5.5Φ (Φ is the beam diameter).

If the detaining time is less than 2 µs, the energy input is insufficient, making it difficult to introduce strain. If the detaining time is more than 20 µs, the treatment using the electron beam takes long time, and the productivity decreases. If the moving rate is less than 30 m/s, the productivity decreases due to an increase in treatment time. Although no upper limit is placed on the moving rate, the upper limit is practically about 300 m/s. If the moving region length L is less than 0.5Φ with respect to the beam diameter Φ, adjacent detaining points are excessively close to each other. This hinders sufficient closure domain formation, and causes a decrease in iron loss improvement. If the moving region length L is more than 5.5Φ with respect to the beam diameter Φ, a closure domain is formed not in a continuous linear shape but in a local island shape, as a result of which the magnetic domain refining effect decreases.

The expression "a compressive stress region and a tensile stress region alternate in the longitudinal direction of the linear strain portion" denotes that a compressive stress region, a tensile stress region, a compressive stress region, a tensile stress region, . . . appear repeatedly in this order in the extending direction of the linear strain portion (direction intersecting the rolling direction). As described above, each compressive stress region is formed in the foregoing detaining point, and each tensile stress region is formed in the foregoing moving region. Therefore, the interval between adjacent compressive stress regions (the interval between adjacent tensile stress regions), that is, the interval at which a compressive stress region and a tensile stress region alternate, matches the interval between detaining points mentioned above (see FIG. 3). The interval between detaining points is the sum of the moving region length L and the beam diameter Φ. Accordingly, the interval between detaining points is preferably 1.5Φ or more. The interval between detaining points is preferably 6.5Φ or less.

Electron Beam Irradiation Interval in Rolling Direction of Steel Sheet

In the case of forming a plurality of linear strain portions (irradiated portions) in the steel sheet, the interval between irradiated portions in the rolling direction is preferably 7.0 mm or more. The interval between irradiated portions in the rolling direction is preferably 15 mm or less, preferably 7.0 to 15 mm. If the line interval between irradiated portions is excessively narrow, an excessive amount of strain is introduced into the whole steel sheet, as a result of which properties such as noise and hysteresis loss degrade. If the line interval between irradiated portions is excessively wide, the magnetic domain refining effect decreases, and the iron loss improving effect decreases.

The electron beam irradiation conditions according to the present disclosure will be described in detail below.

Accelerating Voltage: 60 kV or More and 300 kV or Less

A higher accelerating voltage is preferable in order to increase the transmissivity of the electron beam through the steel sheet. If the transmissivity through the steel sheet is high, strain can be introduced into the steel sheet even under the condition that the electron beam is not focused on the steel sheet surface. The accelerating voltage is therefore preferably 60 kV or more. The accelerating voltage is more preferably 90 kV or more, and further preferably 120 kV or more.

If the accelerating voltage is excessively high, it is difficult to shield X-rays generated due to electron beam irradiation. The accelerating voltage is therefore preferably 300 kV or less, from a practical perspective. The accelerating voltage is more preferably 200 kV or less. In this embodiment, it is important to provide a difference in strain amount in the longitudinal direction of the linear strain portion. Hence, the foregoing upper limit of the accelerating voltage is preferable from the perspective of reducing the amount of strain introduced in the beam moving region, too.

Electron Beam Diameter: 300 µm or Less

A smaller electron beam diameter is preferable because the energy density is higher and greater strain can be introduced in a just focal point. Accordingly, in this embodiment, the electron beam diameter is preferably 300 µm or less. The beam diameter is more preferably 280 µm or less, and further preferably 260 µm or less. The beam diameter herein denotes a half-value width of a beam profile acquired by a slit method using a slit of 30 µm in width.

Although no lower limit is placed on the beam diameter, the lower limit of the beam diameter is preferably about 50 µm from a practical perspective.

Beam Current: 0.5 mA to 40 mA

A lower beam current is preferable from the perspective of reducing the beam diameter. If the current is high, the beam diameter tends to be large due to Coulomb repulsion. Accordingly, in this embodiment, the beam current is preferably 40 mA or less. If the beam current is excessively low, energy for forming strain is insufficient. The beam current is therefore preferably 0.5 mA or more.

Vacuum in Beam Irradiation Region: 3 Pa or Less

The electron beam is subjected to scattering by gas molecules, and the beam diameter increases or the energy decreases. Hence, higher vacuum in the beam irradiation region is preferable. The vacuum in the beam irradiation region desirably has a pressure of 3 Pa or less. Although no lower limit is placed on the vacuum, if the vacuum is excessively low, the costs of a vacuum system such as a vacuum pump increase. The vacuum in the beam irradiation region therefore desirably has a pressure of $10^{-5}$ Pa or more.

Amplitude of Steel Sheet: 1 mm or Less

If the amplitude of the steel sheet is excessively high, the steel sheet fractures and the production is hindered. Therefore, the amplitude needs to be controlled within a predetermined range during operation. A just focal point of the electron beam is used as an amplitude reference position, and the amplitude is measured using a laser range finder. The tension in the sheet passing line is adjusted according to the measurement value by the below-described technique, to control the amplitude.

The amplitude is preferably 1 mm or less in the sheet thickness direction, as mentioned above. If the amplitude is more than 1 mm, there is a possibility that the steel sheet fractures and the operation is adversely affected. Although the effects according to the present disclosure are achieved as long as the amplitude exceeds 0 mm by even the slightest margin, the amplitude is more preferably 0.05 mm or more. The amplitude can be applied by installing a guide roll on the rear surface of the steel strip opposite to the surface where the electron beam is irradiated, and varying the position of the guide roll to change the sheet passing tension.

Vibration Frequency of Steel Sheet

The vibration frequency fv of the steel sheet is preferably 10 kHz or more, and more preferably 15 kHz or more. If the vibration frequency fv is not less than this preferable lower limit, the focus variation during beam movement increases, making it easier to obtain the intended stress distribution. Regarding the upper limit of the vibration frequency fv, fv≤f is preferable and fv≤f/2 is more preferable, where f is the detaining frequency of the beam where f=v/d, d is the interval (moving region length+beam diameter) between beam detaining points, and v is the moving rate of the beam. As a result of the vibration frequency fv being not more than f, excessive focus variation in the beam detaining point can be prevented, and the intended stress distribution can be easily obtained.

Closure Domain Width: 400 μm or Less

In the case where the closure domain formed by the beam irradiation of the steel sheet is wide, the strain amount increases, and accordingly the magnetostriction increases. The closure domain width is therefore desirably 400 μm or less.

Figure 9:
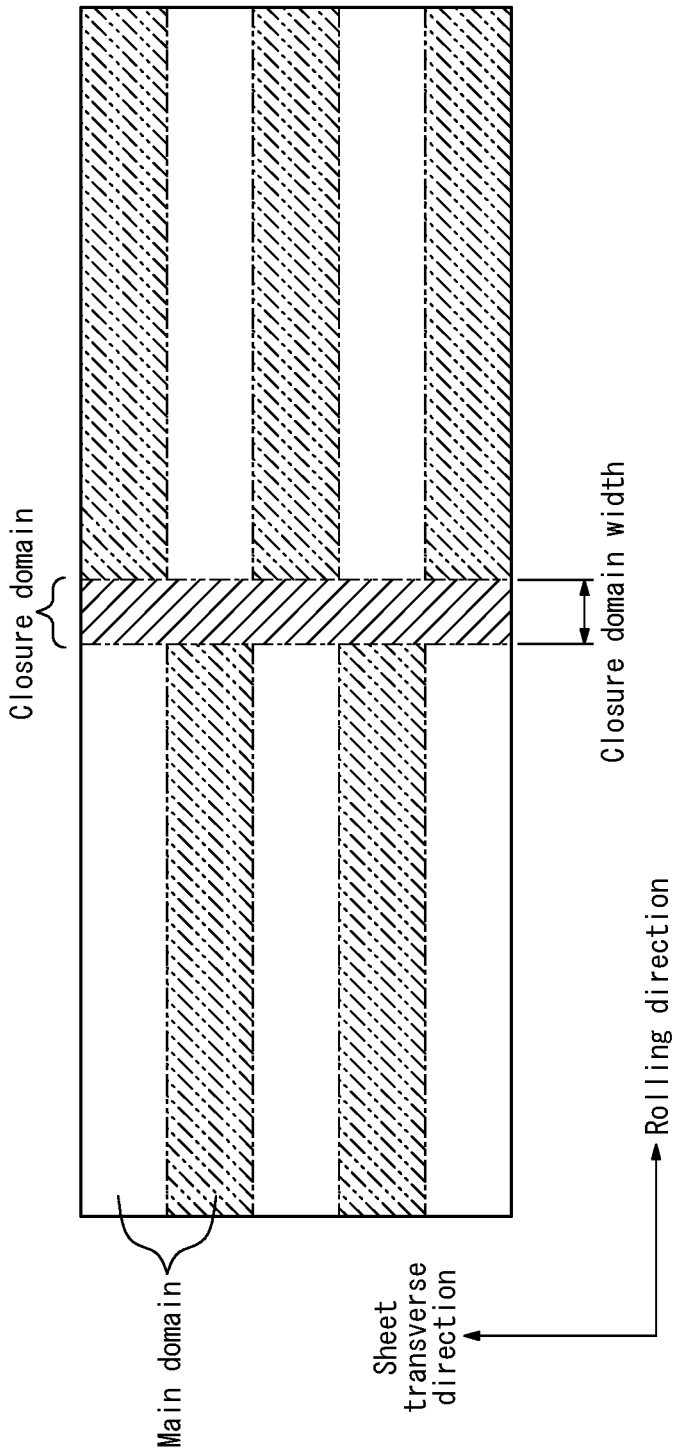
FIG. 9 is a schematic view of a closure domain width in a grain-oriented electrical steel sheet.

The closure domain width herein denotes the area length of the closure domain in the rolling direction, as illustrated in FIG. 9. Specifically, the closure domain width is represented by the transfer length in the rolling direction when a commercially available magnet viewer is placed on the beam irradiation surface and the closure domain is transferred.

The closure domain width can be adjusted by changing the foregoing beam irradiation conditions as appropriate.

EXAMPLES

More detailed description will be given below by way of examples. The following examples merely represent preferred examples, and the present disclosure is not limited to these examples. Modifications can be made within the range in which the subject matter of the present disclosure is applicable, with such modifications being also included in the technical scope of the present disclosure.

Each grain-oriented electrical steel sheet produced by a known method was subjected to magnetic domain refining treatment. In the magnetic domain refining treatment, while applying an amplitude of 0 mm to 1.1 mm to the steel sheet in the sheet thickness direction, the steel sheet was irradiated in the direction orthogonal to the rolling direction with a laser of 1.5 kW in power or an electron beam of an accelerating voltage of 120 kV, an electron beam diameter of 200 μm, a beam current of 10 mA, and a vacuum in the beam irradiation region of 0.3 Pa, at 8.0 mm intervals in the rolling direction, as shown in Table 1. For some steel sheets irradiated with an electron beam, the accelerating voltage was 120 kV and the beam current was 5 mA (Nos. 6 and 17 in Table 1, the other conditions being the same). The irradiation method was continuous irradiation or dot-shaped irradiation. The dot-shaped irradiation was performed with a detaining time of 8 μs, a moving rate of 40 m/s, and a moving region length of 120 μm, for both laser irradiation and electron beam irradiation. The steel sheets (materials) used in magnetic domain refining had $B_8$ of 1.92 T and 1.94 T.

The samples obtained as a result of the magnetic domain refining treatment had $B_8$ of 1.92 T and 1.94 T, too.

For each obtained sample, the iron loss ($W_{17/50}$) when applying an alternating magnetic field of 1.7 T and 50 Hz by 100 mm SST (single sheet magnetism test) was measured. Moreover, the strain introduced into each steel sheet was measured by XRD measurement (under the conditions of Cu-Kα, hv=30 keV, and measurement pitch of 5 μm). Whether the sample had a stress distribution in which a compressive stress region and a tensile stress region alternate in the longitudinal direction of the linear strain portion was determined, and also the respective maximum values of a compressive stress component and a tensile stress component in the sheet transverse direction were calculated from the strain measurement value. A three-phase stacked iron core for transformers was produced using each sample, and an excitation coil was attached thereto. The iron core was installed in a soundproof chamber and excited, and the noise level was measured using a noise meter (JIS C 1509-1 Class 2). The excitation conditions were 1.7 T and 50 Hz.

The measurement results are shown in Table 1. As can be understood from the results, a grain-oriented electrical steel sheet having both low iron loss and low magnetostriction was obtained under the conditions satisfying the requirements according to the present disclosure. Low magnetostriction of the grain-oriented electrical steel sheet can be recognized from low noise of the iron core for transformers produced using the steel sheet. In the case of using a conventional irradiation method (continuous irradiation and amplitude of 0 mm), the iron loss reduction effect by magnetic domain refining was lower because the magnetic domain width of high $B_8$ material was wide. In the case of performing magnetic domain refining treatment by the presently disclosed technique, on the other hand, the effect of iron loss reduction and noise reduction was higher even in high $B_8$ material. This is considered to have resulted from the difference in magnetoelastic effect, as mentioned above.

With laser irradiation, the same effects as in the case of performing electron beam irradiation under predetermined conditions were not recognized. With electron beam irradiation, the effect of iron loss reduction and noise reduction was seen only when vibrating the steel sheet in the sheet thickness direction and performing dot-shaped irradiation. In the case of performing dot-shaped irradiation with an amplitude of 0 mm, the strain amount varied between the moving region and the detaining point as in the present disclosure, but the effect of iron loss reduction and noise reduction as in the present disclosure was not seen. This is considered to be because, in the case of performing dot-shaped irradiation without vibrating the steel sheet, the difference in strain amount between the moving region and the detaining point was not as large as in the present disclosure because the beam was focused even on the moving region, and the effect of iron loss reduction and noise reduction (magnetostriction reduction) was low.

TABLE 1

| No. | Irradiation means | Irradiation method | Amplitude [mm] | Material $B_8$ [T] | Maximum compressive stress [MPa] | Maximum tensile stress [MPa] | Iron loss [W/kg] | Noise level [dBA] | Remarks |
|---|---|---|---|---|---|---|---|---|---|
| 1 | Laser | Continuous | 0 | 1.94 | 63 | 0 | 0.72 | 40.8 | Comparative Example |
| 2 | | | 0.5 | 1.94 | 60 | <u>0</u> | 0.72 | 38.2 | Comparative Example |
| 3 | | Dot | 0 | 1.94 | 73 | <u>0</u> | 0.72 | 40.2 | Comparative Example |
| 4 | | | 0.5 | 1.94 | 61 | <u>0</u> | 0.72 | 38.1 | Comparative Example |
| 5 | Electron | Dot | 0 | 1.92 | 73 | <u>0</u> | 0.69 | 40.1 | Comparative Example |
| 6 | beam | | <u>0.05</u> | 1.92 | 22 | <u>12</u> | 0.684 | 38.0 | Example |
| 7 | | | 0.1 | 1.92 | 70 | 36 | 0.68 | 37.2 | Example |
| 8 | | | 0.1 | 1.92 | 55 | 48 | 0.68 | 37.9 | Example |
| 9 | | | 0.1 | 1.92 | 84 | 84 | 0.66 | 36.9 | Example |
| 10 | | | 0.3 | 1.92 | 74 | 222 | 0.66 | 36.6 | Example |
| 11 | | | 0.5 | 1.92 | 70 | 316 | 0.66 | 36.6 | Example |
| 12 | | | 0.7 | 1.92 | 82 | 346 | 0.66 | 36.4 | Example |
| 13 | | | 0.9 | 1.92 | 84 | 370 | 0.66 | 36.1 | Example |
| 14 | | | 1.0 | 1.92 | 77 | 398 | 0.66 | 36.0 | Example |
| 15 | | | 1.1 | 1.92 | | Fracture | | | Comparative Example |
| 16 | | | 0 | 1.94 | 73 | 0 | 0.69 | 40.5 | Comparative Example |
| 17 | | | <u>0.05</u> | 1.94 | 22 | <u>14</u> | 0.68 | 37.9 | Example |
| 18 | | | 0.1 | 1.94 | 70 | 36 | 0.67 | 37.6 | Example |
| 19 | | | 0.1 | 1.94 | 55 | 48 | 0.67 | 37.8 | Example |
| 20 | | | 0.1 | 1.94 | 74 | 83 | 0.65 | 34.8 | Example |
| 21 | | | 0.3 | 1.94 | 77 | 228 | 0.65 | 34.6 | Example |
| 22 | | | 0.5 | 1.94 | 72 | 316 | 0.65 | 34.5 | Example |
| 23 | | | 0.7 | 1.94 | 79 | 347 | 0.65 | 34.4 | Example |
| 24 | | | 0.9 | 1.94 | 79 | 371 | 0.65 | 34.2 | Example |
| 25 | | | 1.0 | 1.94 | 74 | 398 | 0.65 | 34.1 | Example |
| 26 | | | 1.1 | 1.94 | | Fracture | | | Comparative Example |
| 27 | | Continuous | 0 | 1.92 | 61 | 0 | 0.70 | 40.0 | Comparative Example |
| 28 | | | <u>0.1</u> | 1.92 | 84 | <u>0</u> | 0.70 | 40.1 | Comparative Example |
| 29 | | | 0.3 | 1.92 | 74 | <u>0</u> | 0.70 | 39.6 | Comparative Example |
| 30 | | | 0.5 | 1.92 | 70 | <u>0</u> | 0.70 | 39.5 | Comparative Example |
| 31 | | | 0.7 | 1.92 | 82 | <u>0</u> | 0.70 | 40.4 | Comparative Example |
| 32 | | | 0.9 | 1.92 | 84 | <u>0</u> | 0.70 | 40.3 | Comparative Example |
| 33 | | | 1.0 | 1.92 | 77 | <u>0</u> | 0.70 | 39.8 | Comparative Example |
| 34 | | | 1.1 | 1.92 | | Fracture | | | Comparative Example |
| 35 | | | 0 | 1.94 | 61 | 0 | 0.71 | 40.2 | Comparative Example |
| 36 | | | <u>0.1</u> | 1.94 | 74 | <u>0</u> | 0.71 | 39.9 | Comparative Example |
| 37 | | | 0.3 | 1.94 | 73 | <u>0</u> | 0.71 | 40.5 | Comparative Example |
| 38 | | | 0.5 | 1.94 | 72 | <u>0</u> | 0.71 | 40.4 | Comparative Example |
| 39 | | | 0.7 | 1.94 | 79 | <u>0</u> | 0.71 | 39.9 | Comparative Example |
| 40 | | | 0.9 | 1.94 | 79 | <u>0</u> | 0.71 | 40.0 | Comparative Example |
| 41 | | | 1.0 | 1.94 | 74 | <u>0</u> | 0.71 | 39.8 | Comparative Example |
| 42 | | | 1.1 | 1.94 | | Fracture | | | Comparative Example |

*Underlines indicate outside of range according to present disclosure.

The invention claimed is:

1. A grain-oriented electrical steel sheet comprising
a linear strain portion extending in a direction intersecting a rolling direction of the grain-oriented electrical steel sheet,
wherein the linear strain portion has a stress distribution in which a compressive stress region and a tensile stress region alternate in a longitudinal direction of the linear strain portion, and
wherein a maximum compressive stress in the longitudinal direction of the linear strain portion in the compressive stress region is 30 MPa or more and not more than a yield stress, and a maximum tensile stress in the longitudinal direction of the linear strain portion in the tensile stress region is 20 MPa or more and not more than the yield stress.

2. The grain-oriented electrical steel sheet according to claim 1, comprising
a magnetic flux density $B_8$ of 1.94 T or more.

3. A production method for a grain-oriented electrical steel sheet, comprising
forming a linear strain portion in a grain-oriented electrical steel sheet,
wherein the linear strain portion is formed by vibrating the grain-oriented electrical steel sheet in a sheet thickness direction, while irradiating a surface of the grain-oriented electrical steel sheet with an electron beam by repeatedly moving and detaining the electron beam in a direction intersecting a rolling direction of the grain-oriented electrical steel sheet,
thereby producing the grain-oriented electrical steel sheet of claim 1.

4. The production method for a grain-oriented electrical steel sheet according to claim 3, wherein an amplitude of the vibration of the grain-oriented electrical steel sheet in the sheet thickness direction is 1 mm or less.

* * * * *